3,544,293
PRODUCTION OF ALPHA-CRISTOBALITE FIBERS

Eugene F. Riebling, Horseheads, N.Y., assignor to Corning Glass Works, Corning, N.Y., a corporation of New York
No Drawing. Filed Apr. 26, 1968, Ser. No. 724,606
Int. Cl. C03b 37/00; C01b 33/12
U.S. Cl. 65—2              5 Claims

ABSTRACT OF THE DISCLOSURE

This invention relates to the manufacture of alpha-cristobalite fibers wherein fused silica bodies are placed in a bath of molten lithium and/or sodium-containing glass operating at about 1300°–1600° C. for a sufficient length of time to cause the conversion of the fused silica to beta-cristobalite. The body is then cooled to room temperature, the cubic beta-cristobalite being transformed to tetragonal alpha-cristobalite at temperatures around 218° C. The alpha-cristobalite forms as prism-like crystals aligned toward the center of the body.

---

The use of inorganic fibers as reinforcing elements in plastics, rubbers, glasses, and even in metals has been well-known to the art. The most widely-used materials for such service are probably glass fibers. However, it has long been recognized that crystalline fibers, particularly single crystal fibers, exhibit mechanical strengths much greater than those intrinsic to glass fibers. This knowledge has led to extensive research into the production of inorganic fibers of various compositions, much of this research being directed toward fibers of silicon carbide and alumina.

I have discovered that a fibrous material containing alpha-cristobalite crystals in lengths up to about 2 mm. and, sometimes longer, with diameters varying between about 1–30 microns, can be produced from fused silica bodies. The fibers are reasonably uniform in diameter throughout their length thereby rendering them especially suitable for reinforcing elements in various matrices. The length-to-diameter ratios of the fibers normally vary from about 10–1000 to 1 which is very satisfactory for strength purposes. The fibers are quite flexible in that they can be bent to form a circle without fracture and, when broken, exhibit a brittle fracture. X-ray diffraction analyses of the fibers have demonstrated them to be alpha-cristobalite crystals. The fibers are white in color.

In general terms, the production of alpha-cristobalite fibers according to my invention comprises two principal steps: First, a body of fused silica is placed in a bath of a molten lithium and/or sodium silicate glass and held therein at a temperature between about 1300°–1600° C. for a period of time sufficient to completely transform the fused silica to cubic beta-cristobalite; and, second, the body of cubic beta-cristobalite is then cooled to room temperature such that at temperatures around 218° C. the cubic beta-cristobalite will be converted to crystals of tetragonal alpha-cristobalite. Inasmuch as this conversion of beta-cristobalite to alpha-cristobalite is accompanied by a relatively large volume change and takes place at a temperature well below that at which the glass flows (thus the glass-to-cristobalite body interface is quite rigid), the alpha-cristobalite crystals form as numerous prisms aligned toward the center of the body.

I have learned that alpha-cristobalite fibers can be obtained with a variety of lithium and/or sodium containing glass compositions. In other words, the presence of lithium and/or sodium ions is required to cause the conversion of beta-cristobalite to alpha-cristobalite and the glass should be resistant to devitrification so it will not crystallize as the melt is being cooled. Also, the glass ought not to react chemically with fused silica to any appreciable extent such that the body thereof dissolves in the melt. I have found that boro-silicate, aluminosilicate, and lime-silicate glasses to be particularly suitable.

Table I records several glass compositions, expressed in weight percent on the oxide basis, operable in my invention. The batch ingredients may comprise any materials, either oxides or other compounds, which, on being melted together, are converted to the desired oxide compositions in the proper proportions. The batches were compounded, ballmilled to insure melt homogeneity, and then melted for eight hours at 1400–1500° C. in open platinum crucibles. Rods of fused silica varying in diameter from about 1.5–5.0 mm. were then immersed in the melt and maintained therein for periods of time ranging about 3–100 hours to secure essentially complete conversion of the fused silica to beta-cristobalite. The crucibles containing the melt and rods were thereafter cooled to room temperature in such a manner that the rods were exposed to temperatures around 218° C. for an extended period of time so as to permit the conversion of beta-cristobalite to alpha-cristobalite. Commonly, this was accomplished by annealing the glassy phase and holding crucible at between about 218°–250° C. for 4–12 hours before slowly cooling to room temperature. Longer times may be utilized but with no apparent advantage. The annealing is undertaken to insure that the glass does not crack during the transformation of beta- to alpha-cristobalite, thereby releasing the stress that appears necessary to grow the fibers. Although the annealing step comprises the preferred manner of cooling the glass, crucibles have been removed from the heating chamber directly into the ambient atmosphere and then held at between about 218°–250° C. for 4–12 hours.

TABLE I

| Example | Percent | | | | | | |
|---|---|---|---|---|---|---|---|
|  | 1 | 2 | 3 | 4 | 5 | 6 | 7 |
| $SiO_2$ | 59 | 56 | 57 | 52 | 74 | 64.5 | 74.1 |
| $B_2O_3$ | 39 | 36 | 38 | | | | |
| $Na_2O$ | 2 | 8 | 5 | 18 | 26 | | 16.6 |
| $Al_2O_3$ | | | | 30 | | 27.5 | |
| $Li_2O$ | | | | | | 8.0 | |
| CaO | | | | | | | 9.3 |

Batches of Example 1 were melted at 1500° C. and fused silica rods of 2 mm. diameter immersed therein for 6, 12, 24, 48 and 100 hours, respectively. The crucibles containing the rods and melt were transferred to an electrically-fired annealer operating at 650° C., the electric current was turned off and the crucible cooled to room temperature retained within the annealer, this cooling taking about 12 hours. The glass and immersed rod were removed from the crucible and the glass separated from the rod. Microscopic examination of a cross-section of the rod indicated the presence of prism-like crystals aligned toward the center of the rod. The rods which had been immersed in the melt for six and 12 hours, respectively, had a small center core of fused silica, therefore demonstrating that complete conversion of the rod to beta-cristobalite had not occurred during the immersion step. However, each of the remaining rod samples appeared to consist essentially completely of fibrous material which, upon X-ray diffraction analysis thereof, was determined to be alpha-cristobalite. However, the 48-hour and 100-hour rod samples showed some corrosion by the glass melt. The fibers were readily separable from each other mechanically. Hence, only very nominal physical contact of the rod was usually required to cause the fibers ot be dislodged therefrom as individual fibers. The fibers ranged about 10–25 microns in diameter and about 0.25–1.0 mm. in length.

Batches of Examples 2 and 3 were melted at 1400° C.

and 1500° C., respectively, and fused silica rods of 2 mm. diameter were immersed therein for 6, 12, 24, 48, and 100 hours, respectively. The same annealing treatment and slow cooling to room temperature were applied to these examples as recited above with respect to Example 1 except that the initial temperature of the annealer was 525° C. Microscopic examination of a cross-section of the treated rod illustrated the virtual absence of any fused silica core, thereby demonstrating the essentially complete transformation of the fused silica to beta-cristobalite during the immersion step. However, here again, corrosion of the fused silica was quite apparent in the 48 and 100 hour range. The fibers, identified by X-ray diffraction analysis to be alpha-cristobalite, appeared to have a similar morphology to that of the fibers of Example 1 with similar physical dimensions. These fibers were likewise very readily separable mechanically from the rod and each other.

A batch of Example 3 was melted at 1500° C. and a fused silica rod of 5 mm. diameter was immersed therein for 20 hours. The crucible was transferred to an electrically-fired annealer operating at 525° C. When the temperature reached 250° C., the annealer was held thereat for seven hours and then the electrical current turned off. The annealer with the crucible retained therein reached room temperature in about 100 hours. Microscopic examination of a cross-section of the rod demonstrated the essential absence of a fused silica core. Prism-like fibers, aligned toward the center of the rod, were determined by X-ray diffraction analysis to be alpha-cristobalite. The fibers were readily separable from each other and ranged from about 5–30 microns in diameter with lengths up to about 2 mm.

A batch of Example 4 was melted at 1500° C. and a fused silica rod of 2 mm. diameter immersed therein for 16 hours. The crucible was removed from the heating chamber and placed in an electrically-fired oven operating at 250° C. After a dwell period of seven hours, the electric power to the oven was cut off and the oven allowed to cool to room temperature with the crucible retained therein. This cooling took about 9 hours. After removal from the crucible and separation from the surrounding glass, microscopic examination of a cross-section of the rod indicated it consisted essentially of prism-like fibers aligned toward the center of the rod. The fibers were readily separable from the rod and each other and, through X-ray diffraction analysis, were identified as alpha-cristobalite. Individual fibers varied betwteen about 10–25 microns in diameter with lengths ranging about 0.5–1.0 mm.

A batch of Example 5 was melted at 1500° C. and a fused silict rod of 2 mm. diameter immersed therein for 5 hours. The crucible was transferred from the heating chamber to an electrically-fired oven operating at 250° C. After holding the crucible within the oven for eight hours, the electric power to the oven was turned off and the oven permitted to cool to room temperature with the crucible retained therein. This cooling lasted about 9 hours. After removal from the crucible and separation from the enclosing glass, microscopic examination of the rod indicated the virtual absence of a cross portion of fused silica. Rather the rod consisted essentially entirely of prism-like fibers aligned toward the center of the rod. X-ray diffraction analysis identified these fibers to be alpha-cristobalite. This glass was quite corrosive to the rod, the diameter thereof being reduced to about 1.5 mm. Therefore, the fibers were about 1–10 microns in diameter with lengths ranging about 0.25–0.5 mm. Finally, because of this corrosive effect, the individual fibers were not as readily separable from each other as in Examples 1–4.

A batch of Example 6 was melted at 1500° C. and a fused silica rod of 2 mm. diameter immersed therein for 16 hours. The crucible was removed from the heating chamber and placed in an electrical-fired annealer operating at 690° C. When the temperature reached 250° C., the annealer was held thereat for 8 hours after which the electric current was cut off and the annealer allowed to cool to room temperature with the crucible retained therein, this cooling taking about 10 hours. The glass and rod were removed from the crucible and the surrounding glass separated from the rod. Microscopic examination of a cross-section of the rod showed that it was composed substantially entirely of prism-like fibers aligned toward the center of the rod. These fibers were readily separated mechanically from the rod and each other to yield fibers about 5–25 microns in diameter and about 0.5–1.0 mm. in length. X-ray diffraction analysis identified the fibers to be single crystals of alpha-cristobalite.

A batch of Example 7 was melted at 1400° C. and a fused silica rod of 2 mm. diameter immersed therein for five hours. The crucible was transferred from the heating chamber to an electrically-fired annealer operating at 520° C. When the temperature touched 250° C., the annealer was held thereat for 8 hours after which the electric power was cut off and the annealer allowed to cool to room temperature at its own rate with the crucible retained within, the cooling taking about 10 hours. After removal from the crucible and separation from the surrounding glass, microscopic examination of a cross-section of the rod demonstrated that it consisted essentially completely of prism-like fiber crystals aligned toward the center of the rod. These crystals could be easily disengaged from the rod and separated readily mechanically from each other. Examination by X-ray diffraction analysis determined the crystals to be alpha-cristobalite. In size, the fibers varied between about 5–25 microns in diameter and about 1 mm. in length. This glass was somewhat corrosive to the fused silica rod so, while not nearly so corrosive as Example 5, short immersion periods are desirable.

It is belived that these examples demonstrate the scope of the invention. Thus, a body of fused silica to form the host for the fiber growth and a glass source of $Li^+$ and/or $Na^+$ are required. Although, as Example 4 indicates, high alkali metal content glasses are operable, it is preferred that the total $Li_2O$ and $Na_2O$ content be held under 25% by weight to forestall great corrosion of the fused silica. Likewise, as illustrated in Example 1, the preferred minimum of $Li_2O$ and/or $Na_2O$ is about 2%. The other components of the glass are not particularly critical except, as was observed above, excessive corrosion of the fused silica should be avoided. From a practical point of view, Example 7 is the preferred composition since it demonstrates that the inexpensive, commercially-available soda-lime-silica glasses are operable in the invention.

It can readily be appreciated that since the conversion of fused silica to beta-cristobalite takes place from the surface of the body and proceeds inwardly, the diameter of the body will govern the time required for this conversion. However, long time immersions in the glass melts result in corrosion of the fused silica. Therefore, it has been determined that a practical limit for the diameter of the fused silica bodies is about 10 mm.

I claim:
1. A method for making fibers of alpha-cristobalite which comprises:
   (a) immersing a fused silica body in a $Li_2$ and/or $Na_2O$-containing glass melt at about 1300°–1600° C. for a period of time sufficient to transform the fused silica to beta-cristobalite; and then
   (b) cooling the glass melt with the beta-cristobalite body retained therein to room temperature, the beta-cristobalite body being maintained at temperatures in the vicinity of 218° C. for a sufficient length of time to cause the conversion of said beta-cristobalite to alpha-cristobalite fibers in the form of prism- like crystals aligned toward the center of the body.

2. A method according to claim 1 wherein said fused silica body has a diameter less than about 10 mm.

3. A method according to claim 1 wherein said glass melt contains about 2–25% by weight of $Li_2O$ and/or $Na_2O$.

4. A method according to claim 1 wherein said period of time sufficient to transform the fused silica to beta-cristobalite ranges about 3–100 hours.

5. A method according to claim 1 wherein said time sufficient to cause the conversion of beta-cristobalite to alpha-cristobalite ranges about 4–12 hours.

References Cited

UNITED STATES PATENTS

| | | | |
|---|---|---|---|
| 2,894,929 | 7/1959 | Newton | 23—182 XR |
| 3,445,252 | 5/1969 | MacDowell | 65—33 XR |

FOREIGN PATENTS

| | | | |
|---|---|---|---|
| 150,107 | 1962 | U.S.S.R. | 23—182 |
| 153,544 | 1962 | U.S.S.R. | 23—182 |

OTHER REFERENCES

Nature, Nov. 17, 1956, p. 1131.

J. Recherches Centre Natl. Recherches Sci. (Paris), 1950, pp. 101–106 (article by Celia Martinez).

EDWARD STERN, Primary Examiner

U.S. Cl. X.R.

23—182, 295; 65—30, 33, 60; 106—69